(12) United States Patent
Sasaki et al.

(10) Patent No.: US 11,034,849 B2
(45) Date of Patent: Jun. 15, 2021

(54) INK EMULSION COMPOSITION AND WATER-BASED INK

(71) Applicant: NIPPON KAYAKU KABUSHIKI KAISHA, Tokyo (JP)

(72) Inventors: Keijyou Sasaki, Tokyo (JP); Shinsuke Shimizu, Tokyo (JP); Shunta Misawa, Tokyo (JP); Junya Maseki, Tokyo (JP); Hiroko Higuchi, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 15/768,622

(22) PCT Filed: Oct. 28, 2016

(86) PCT No.: PCT/JP2016/004738
§ 371 (c)(1),
(2) Date: Apr. 16, 2018

(87) PCT Pub. No.: WO2017/073069
PCT Pub. Date: May 4, 2017

(65) Prior Publication Data
US 2018/0305566 A1 Oct. 25, 2018
US 2020/0040202 A9 Feb. 6, 2020

(30) Foreign Application Priority Data

Oct. 30, 2015 (JP) .............................. JP2015-215302
Jul. 25, 2016 (JP) .............................. JP2016-145144

(51) Int. Cl.
| | |
|---|---|
| *C09D 11/023* | (2014.01) |
| *B41J 2/01* | (2006.01) |
| *B41M 5/00* | (2006.01) |
| *C09D 11/033* | (2014.01) |
| *C09D 11/38* | (2014.01) |
| *C09D 11/32* | (2014.01) |
| *D06P 5/00* | (2006.01) |
| *C09D 11/037* | (2014.01) |
| *C09D 11/107* | (2014.01) |
| *C09D 11/322* | (2014.01) |
| *C09D 11/328* | (2014.01) |
| *D06P 5/30* | (2006.01) |

(52) U.S. Cl.
CPC .............. *C09D 11/023* (2013.01); *B41J 2/01* (2013.01); *B41M 5/00* (2013.01); *C09D 11/033* (2013.01); *C09D 11/037* (2013.01); *C09D 11/107* (2013.01); *C09D 11/32* (2013.01); *C09D 11/322* (2013.01); *C09D 11/328* (2013.01); *C09D 11/38* (2013.01); *D06P 5/00* (2013.01); *D06P 5/001* (2013.01); *D06P 5/30* (2013.01)

(58) Field of Classification Search
CPC ... C09D 11/023; C09D 11/033; C09D 11/037; C09D 11/32; C09D 11/322; C09D 11/38; C09D 11/107; C09D 11/328; C09D 11/106; D06P 5/00; D06P 5/001; D06P 5/30; C08K 5/18; C08K 5/3437; C08K 5/315; C08K 5/41; C08K 5/053; B41J 2/01
USPC ........................................................ 523/160
See application file for complete search history.

(56) References Cited

U.S. PATENT DOCUMENTS

| | | | |
|---|---|---|---|
| 6,402,828 B1 * | 6/2002 | Chisholm | C09B 67/0046 106/496 |
| 2004/0171718 A1 * | 9/2004 | Nakamura | C09D 11/40 523/160 |
| 2007/0146454 A1 | 6/2007 | Doi et al. | |
| 2009/0117349 A1 * | 5/2009 | Saito | C09B 67/0036 428/195.1 |
| 2010/0178425 A1 * | 7/2010 | Ooishi | C09D 11/322 427/256 |
| 2012/0220703 A1 * | 8/2012 | Kido | C09B 67/0022 524/90 |

(Continued)

FOREIGN PATENT DOCUMENTS

| | | |
|---|---|---|
| CN | 101389718 A | 3/2009 |
| CN | 103374251 A | 10/2013 |
| JP | H08183920 A | 7/1996 |

(Continued)

OTHER PUBLICATIONS

Taku Mitsuhashi et al., "Inkjet Textile Printing System", Journal of the Imaging Society of Japan, 2002, pp. 68-74, vol. 41, Issue 2.

(Continued)

*Primary Examiner* — Hannah J Pak
(74) *Attorney, Agent, or Firm* — Kenja IP Law PC

(57) ABSTRACT

Disclosed is an ink emulsion composition that, when used as an ink composition, retains a high concentration of a colorant and exhibits good re-dispersibility after drying, and that causes no change in the physical properties of the ink when stored for a long period of time. The ink emulsion composition contains: (A) a dye and/or a pigment; (B) a styrene-(meth)acrylic copolymer; and (C) a compound in an amount of more than 0.18 mass %, the compound (C) being represented by formula (1):

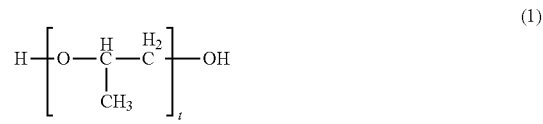

(1)

where t represents 1 to 5.

15 Claims, No Drawings

(56) References Cited

U.S. PATENT DOCUMENTS

| | | | |
|---|---|---|---|
| 2015/0116419 A1 | 4/2015 | Oura et al. | |
| 2020/0270474 A1* | 8/2020 | Misawa | C08K 5/42 |

FOREIGN PATENT DOCUMENTS

| | | |
|---|---|---|
| JP | H08333531 A | 12/1996 |
| JP | 2675956 B2 | 11/1997 |
| JP | H09291235 A | 11/1997 |
| JP | 2003246954 A | 9/2003 |
| JP | 3534395 B2 | 6/2004 |
| JP | 2005298802 A | 10/2005 |
| JP | 3839829 B2 | 11/2006 |
| JP | 4016483 B2 | 12/2007 |
| JP | 4078679 B2 | 4/2008 |
| JP | 2008255241 A | 10/2008 |
| JP | 2011021133 A | 2/2011 |
| WO | 2010013651 A1 | 2/2010 |
| WO | 2013115071 A1 | 8/2013 |
| WO | 2014129322 A1 | 8/2014 |

OTHER PUBLICATIONS

Is Kabushiki Kaisha et al, Senshoku Keizai Shimbun, Jan. 28, 2004, pp. 18-21.

The Society of Chemical Engineers, Japan, Chemical Engineering Dictionary, Mar. 2005, pp. 46-47, 4th Edition, Maruzen Publishing Co., Ltd.

DIC Corporation, DIC Technical Review No. 10/2004, 2004.

Dec. 13, 2016, International Search Report issued in the International Patent Application No. PCT/JP2016/004738.

May 1, 2018, International Preliminary Report on Patentability issued in the International Patent Application No. PCT/JP2016/004738.

May 20, 2019, the Extended European Search Report issued by the European Patent Office in the corresponding European Patent Application No. 16859307.7.

Jul. 23, 2020, Office Action issued by the China National Intellectual Property Administration in the corresponding Chinese Patent 201680058675.9.

Feb. 15, 2021, Communication pursuant to Article 94(3) EPC issued by the European Patent Office in the corresponding European Patent Application No. 16859307.7.

Nov. 10, 2020, Notification of Reasons for Refusal issued by the Japan Patent Office in the corresponding Japanese Patent Application No. 2017-547627.

Mar. 11, 2021, Office Action issued by the China National Intellectual Property Administration in the corresponding Chinese Patent Application No. 201680058675.9.

Ding Zhong Chuan et al., Textile dyeing aid agent, Sep. 1988.

* cited by examiner

INK EMULSION COMPOSITION AND WATER-BASED INK

TECHNICAL FIELD

This disclosure relates to a novel ink emulsion composition having extremely high storage stability and a water-based ink composition using the same.

BACKGROUND

As digitalization of information progresses, inkjet printing has been widely used in office and home printers. In recent years there have been many applications advanced to commercial printing, textile printing, and the like. As inkjet printing applications are expanding, a variety of coloring materials for use in ink formulations are also being used depending on the applications, including water-soluble dyes such as conventional acidic dyes and direct dyes, water-insoluble colorants such as disperse dyes and pigments, and the like.

Disperse dyes are widely used for industrial dyeing of hydrophobic fibers such as polyesters, and they are used for dyeing by dispersing a water-insoluble dye in a dye bath or color paste. As the dye infiltrates and diffuses in a dispersed state inside the fiber under high temperature conditions, dyeing is caused by hydrogen bonding between fiber dyes, intermolecular force, or the like. If the dispersibility of the dye, especially the dispersibility at high temperature is poor, aggregation of the dye occurs in the high-temperature dyeing bath, causing specks to easily form (a phenomenon that results from poor dispersion of the dye during dyeing, in which the dye adheres in a dotted manner to the fibers, leading to generation of stains in the object to be dyed). For this reason, conventionally, for fiber dyeing, dispersants excellent in high temperature dispersibility, for example, anionic dispersants have been mainly used, such as formaldehyde condensates of lignosulfonic acid, formaldehyde condensates of alkylnaphthalenesulfonic acid, and formaldehyde condensates of creosote oil sulfonic acid.

Ink jet printing of polyester fibers has also been carried out using disperse dyes (*Journal of the Japan Imaging Society*, Vol. 41, No. 2, pp 68 to p 74 (2002) [NPL 1] and *Senshoku Keizai Shimbun*, Jan. 28, 2004, pp. 18-21 [NPL 2]) and the following methods have been mainly used: direct printing in which dye ink is applied (printed) to fibers and then heat treatment such as steaming is performed to implement dyeing; and thermal transfer printing in which dye ink is applied (printed) to a sheet of special transfer paper and subsequently the dye is sublimated and transferred from the transfer paper to fibers by heat. For dispersing disperse dye ink used for printing, anionic dispersants used conventionally for industrial dyeing have been used (JP H9-291235 A [PTL 1] and JP H8-333531 A [PTL 2]). However, our studies revealed that these anionic dispersants are problematic not only in the sedimentation stability in dispersions, but also in the ejection stability of the resulting ink. JP 2003-246954 A (PTL 3) describes the use of a dispersant of the expression 1 in PTL 3. It was also found, however, that the dispersant exhibited good discharge stability, but is still problematic in sedimentation stability (storage stability).

In order to expand the field of use of printing processes using ink, there is ongoing need for ink compositions used for ink jet recording and the resulting colored objects to have fastnesses such as light fastness, water resistance, and so on. Such ink compositions used for ink jet recording are strongly required to be stable as ink for a long period of time and to be redissolved or redispersed in water when dried.

In particular, disperse dyes are required to be stable over an extended period of time. It is generally known that a dye which exists in a dispersed state as particles, not as a molecule, in ink causes a sedimentation phenomenon over time due to aggregation of dye particles. This causes a concentration gradient in the ink, and the desired printing properties cannot be obtained. In the worst case, aggregated particles clog the nozzles, preventing them from ejecting the ink.

Therefore, there is a demand for development of an ink composition that has good fastnesses, high image density obtained by printing, and good storage stability when used as an ink composition. However, the conventional techniques have not been able to provide sufficient performance.

Inkjet ink compositions using a pigment include the ink of JP 4078679 B (PTL 6). This is an ink composition prepared by using a polymer dispersion. In addition, JP 4016483 B (PTL 5) describes an ink composition using a self-dispersion type pigment.

In recent years, microcapsule pigments using a self-assembled pigment have been extensively studied and investigated as means for addressing the above issues. In this respect, JP 2675956 B (PTL 8) describes a manufacturing method thereof. However, none of these ink compositions has yet provided products that fully satisfy the market requirements.

CITATION LIST

Patent Literature

PTL 1: JP H9-291235 A
PTL 2: JP H8-333531 A
PTL 3: JP 2003-246954 A
PTL 4: JP 3534395 B
PTL 5: JP 4016483 B
PTL 6: JP 4078679 B
PTL 7: WO 2010/013651 A
PTL 8: JP 2675956 B
PTL 9: JP 3839829 B
PTL 10: WO 2014/129322 A
PTL 11: WO 2013/115071 A

Non-Patent Literature

NPL 1: *Journal of the Japan Imaging Society*, Vol. 41, No. 2, pp 68 top 74 (2002)
NPL 2: *Senshoku Keizai Shimbun*, Jan. 28, 2004, pp. 18-21
NPL 3: *Chemical Engineering Dictionary*, 4th Edition, pp. 46-47
NPL 4: *DIC Technical Review No.* October 2004

SUMMARY

Technical Problem

It would thus be helpful to provide an ink emulsion composition that offers good storage stability of a dispersion, that has good stability when used as an ink composition, and that preserves the physical properties when stored for a long period of time.

Solution to Problem

As a result of our diligent investigation to solve the above issues, it was found that extremely high ink stability can be obtained with an emulsion liquid containing a dye and/or a pigment, a styrene-acrylic copolymer, and a propylene glycol-based solvent, and the present disclosure was completed based on this finding.

In other words, the present disclosure relates to 1) to 18) below.

1)
An ink emulsion composition comprising: (A) a dye and/or a pigment; (B) a styrene-(meth)acrylic copolymer; and (C) a compound in an amount of more than 0.18 mass %, the compound (C) being represented by formula (1):

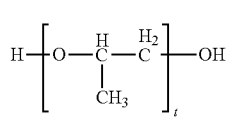

(1)

where t represents 1 to 5.

2)
The ink emulsion composition according to 1), wherein the component (A) is at least one dye selected from a disperse dye, an oil-soluble dye, or a vat dye.

3)
The ink emulsion composition according to 1) or 2), wherein the component (A) is at least one dye selected from C.I. Disperse Yellow 54, C.I. Disperse Orange 25, C.I. Disperse Red 60, C.I. Disperse Blue 72, 359, 360, C.I. Disperse Brown 26, 27, or C.I. Solvent Orange 60.

4)
The ink emulsion composition according to any one of 1) to 3), wherein the component (B) has a weight-average molecular weight of 1000 or more and 20000 or less.

5)
The ink emulsion composition according to any one of 1) to 4), wherein the component (B) has a glass transition temperature of 45° C. or higher and 135° C. or lower.

6)
The ink emulsion composition according to any one of 1) to 5), wherein the component (B) is a styrene-acrylic copolymer having in its molecule a skeleton represented by the following formula (2) or (3):

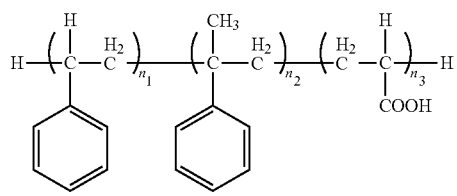

(2)

where $n_1$ to $n_3$ each represent an integer of 1 to 30, or

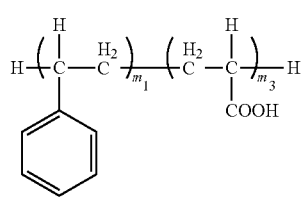

(3)

where $m_1$ and $m_2$ each represent an integer of 1 to 43.

7)
The ink emulsion composition according to any one of 1) to 6), wherein t is 2 in the component (C).

8)
The ink emulsion composition according to any one of 1) to 7), further comprising: (D) a compound having in its molecule both substituents of an amino group and a sulfo group.

9)
The ink emulsion composition according to 8), wherein the component (D) is a compound represented by formula (4):

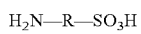

$$H_2N-R-SO_3H \quad (4)$$

where R represents an alkylene group, an alkylidene group, or an arylene group which may have a substituent.

10)
The ink emulsion composition according to any one of 1) to 9), further comprising: (E) a water-soluble organic solvent.

11)
The ink emulsion composition according to 10), wherein the component (E) is a water-soluble organic solvent having in its molecule one or more hydroxy groups.

12)
The ink emulsion composition according to any one of 1) to 11), wherein the component (A) has a number-average particle size of 10 nm to 500 nm.

13)
A method of producing the ink emulsion composition as recited in any one of 1) to 12), the method comprising neutralizing and dissolving with an alkaline aqueous solution.

14)
An ink dispersion composition comprising: the ink emulsion composition as recited in any one of 1) to 12); and (F) a defoamer.

15)
The ink dispersion composition according to 14), wherein the component (F) is a nonionic surfactant.

16)
The ink dispersion composition according to 14) or 15), further comprising: (G) a preservative.

17)
A water-based ink comprising either the ink emulsion composition as recited in any one of 1) to 12) or the ink dispersion composition as recited in any one of 14) to 16).

18)
The water-based ink according to 17), further comprising: (H) a compound represented by formula (5):

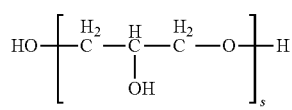

(5)

where s represents 1 to 5.

Advantageous Effect

According to the present disclosure, an ink emulsion composition having excellent storage stability can be obtained, and an aqueous dispersion and an ink composition of a water-insoluble colorant can be provided by utilizing the same.

DETAILED DESCRIPTION

The emulsion composition of the present disclosure is a mixture produced when strongly stirring two different liquids which are not mutually soluble, for example, one in which oil is emulsified in water, or one in which water is emulsified in oil.

[Component (A): Dye and/or Pigment]

In the present disclosure, the component (A) is a dye and/or a pigment.

As used herein, the term "dye" refers to an organic coloring matter which is dyed onto fibers by an appropriate dyeing method. Examples thereof include a direct dye, a vat dye, a sulfur dye, a disperse dye, a basic dye, a naphthol dye, an acidic dye, an acidic mordant dye, a mordant dye, an oil-soluble dye, a reactive dye, a soluble vat dye, a sulfur vat dye, and an oxidation dye.

Specifically, examples of C.I. Disperse Yellow include C.I. Disperse Yellow 3, 4, 5, 7, 8, 9, 13, 23, 24, 30, 33, 34, 39, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 200, 202, 204, 210, 211, 215, 216, 218, 224, and 237. Also, examples of C.I. Disperse Orange include C.I. Disperse Orange 1, 1:1, 3, 5, 7, 11, 13, 17, 20, 21, 23, 24, 25, 25:1, 29, 30, 31, 32, 33, 37, 38, 42, 43, 44, 45, 47, 48, 49, 50, 53, 54, 55, 56, 57, 58, 59, 61, 66, 71, 73, 76, 78, 80, 86, 89, 90, 91, 93, 96, 97, 118, 119, 127, 130, 139, and 142. Also, examples of C.I. Disperse Red include C.I. Disperse Red 1, 4, 5, 7, 11, 12, 13, 15, 17, 27, 43, 44, 50, 52, 53, 54, 55, 55:1, 56, 58, 59, 60, 65, 70, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 158, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 283, 288, 298, 302, 303, 310, 311, 312, 320, 323, 324, 328, 359, 362, and 364. Other examples include, but are not limited to: C.I. Disperse Violet 1, 4, 8, 11, 17, 23, 26, 27, 28, 29, 31, 33, 35, 36, 38, 40, 43, 46, 48, 49, 50, 51, 52, 56, 57, 59, 61, 63, 69, 77, and 97; C.I. Disperse Green 9; C.I. Disperse Brown 1, 2, 4, 9, 13, 19, 26, and 27; C.I. Disperse Blue 3, 5, 7, 9, 14, 16, 19, 20, 26, 26:1, 27, 35, 43, 44, 54, 55, 56, 58, 60, 62, 64, 64:1, 71, 72, 72:1, 73, 75, 77, 79, 79:1, 81, 82, 83, 87, 91, 93, 94, 95, 64:1, 96, 102, 106, 108, 112, 113, 115, 118, 120, 122, 125, 128, 130, 131, 139, 141, 142, 143, 145, 146, 148, 149, 153, 154, 158, 165, 165:1, 165:2, 167, 171, 173, 174, 176, 181, 183, 185, 186, 187, 189, 197, 198, 200, 201, 205, 207, 211, 214, 224, 225, 257, 259, 266, 267, 270, 281, 284, 285, 287, 288, 291, 293, 295, 297, 301, 315, 330, 333, 334, 339, 341, 353, 354, 358, 359, 360, 364, 365, 366, and 368; C.I. Disperse Black 1, 3, 10, and 24; C.I. Solvent Yellow 114; C.I. Solvent Orange 60 and 67; C.I. Solvent Red 146; and C.I. Solvent Blue 36, 63, 83, 105, and 111.

As used herein, the term "pigment" refers to a white or colored powder which is insoluble in water, an organic solvent, or the like. Examples thereof include an organic pigment and an inorganic pigment. In the present disclosure, it may be an organic pigment or an inorganic pigment, yet an organic pigment is preferable.

Specific examples include: C.I. Pigment Yellow 74, 120, 128, 138, 151, 185, and 217; C.I. Pigment Orange 13, 16, 34, and 43; C.I. Pigment Red 122, 146, and 148; C.I. Pigment Violet 19 and 23; C.I. Pigment Blue 15, 15:1, 15:2, 15:3, 15:4, 15:5, and 15:6; and C.I. Pigment Green 7 and 8.

In the present disclosure, a dye is more preferably used. Even more preferably, at least one selected from of a disperse dye, an oil-soluble dye, or a vat dye is used. Among the above dyes, those having higher thermal transfer ability include: C.I. Disperse Yellow 51, 54, 60, 71, 82, and 211; C.I. Disperse Orange 5, 7, 20, 23, 24, 25, and 25:1; C.I. Disperse Red 4, 11, 50, 53, 59, 60, 239, 240, and 364; C.I. Disperse Violet 8, 11, 17, 26, 27, 28, and 36; C.I. Disperse Blue 3, 5, 26, 35, 55, 56, 72, 81, 91, 108, 334, 359, 360, and 366; C.I. Disperse Brown 26 and 27; C.I. Solvent Yellow 114; C.I. Solvent Orange 60 and 67; C.I. Solvent Red 146; and C.I. Solvent Blue 36, 63, 83, 105, and 111. More preferred are: C.I. Disperse Yellow 54; C.I. Disperse Orange 25; C.I. Disperse Red 60; C.I. Disperse Blue 72, 359, and 360; C.I. Disperse Brown 26 and 27; and C.I. Solvent Orange 60. Particularly preferred are: C.I. Disperse Yellow 54; C.I. Disperse Orange 25; and C.I. Disperse Red 60.

These coloring materials may be in the form of a powdery or bulky dry coloring matter or a wet cake or slurry, and may contain a small amount of a dispersant such as a surfactant for the purpose of suppressing the aggregation of the coloring material particles during or after synthesis of the coloring material. These commercially available coloring materials have grades such as for, e.g., industrial dyeing, resin coloring, ink, toner, and inkjet use, and their production methods, purity, pigment particle size, and the like are different from each other. In order to suppress the aggregation after pulverization, a coloring material having a smaller particle size is preferable, and considering the influence on the dispersion stability and the ejection accuracy of the ink, it is preferable to use a coloring material with as little impurities as possible. As a coloring material for black, it is possible to use a dye obtained by blending a blue-based dye as a main ingredient with an orange-based dye and a red-based dye. It may also contain a small amount of other water-insoluble coloring materials within the range of color tone adjustment.

The above-described dye may be obtained by blending, for example, in preparation of a black ink, a blue dye as a main ingredient with an orange dye and a red dye as appropriate so as to be toned to a black color, which may be used as a black dye. For the purpose of finely adjusting the color tone of, for example, blue, orange, red, violet, or black to a favorable color tone, two or more dyes may be blended.

The content of the component (A) in the ink emulsion composition disclosed herein is preferably in the range of 0.1 mass % to 30 mass %, and more preferably in the range of 5 mass % to 20 mass %. When the content of the component (A) in the ink emulsion composition is within the above range, the composition exhibits excellent storage stability and sedimentation properties.

[Component (B): styrene-(meth)acrylic Copolymer]

In the present disclosure, the component (B) is a styrene-(meth) acrylic copolymer, which is a copolymer of a styrenic monomer and a (meth)acrylic monomer. As used herein, the term "(meth)acrylic" means "acrylic" and/or "methacrylic".

Specific examples of these copolymers include an (α-methyl)styrene-acrylic acid copolymer, an (α-methyl)styrene-acrylic acid-acrylic acid ester copolymer, an (α-methyl)styrene-methacrylic acid copolymer, an (α-methyl)styrene-methacrylic acid-acrylic acid ester copolymer, an (α-methyl)styrene-(anhydrous) maleic acid copolymer, an acrylic acid ester-(anhydrous) maleic acid copolymer, an (α-methyl)styrene-acrylic acid ester-(anhydride) maleic acid copolymer, an acrylic acid ester-allylsulfonic acid ester copolymer, an acrylic acid ester-styrene sulfonic acid copolymer, an (α-methyl)styrene-methacrylic sulfonic acid copolymer, a polyester-acrylic acid copolymer, a polyester-acrylic acid-acrylic acid ester copolymer, a polyester-methacrylic acid copolymer, a polyester-methacrylic acid-acrylic acid copolymer ester, and the like. Of these, preferred compounds containing an aromatic hydrocarbon group are those containing styrene.

As used herein, the term "(α-methyl)styrene" should be construed as including α-methyl styrene and styrene.

Specific examples of the component (B) in the present disclosure include, but are not limited to, Joncryl® 52J, 57J, 60J, 63J, 70J, JDX-6180, HPD-196, HPD 96J, PDX-6137 A, 6610, JDX-6500, JDX-6639, PDX-6102B, and PDX-6124 (all manufactured by BASF). As used herein, ® means a registered trademark in Japan, other countries, or both.

In the present disclosure, the component (B) has a weight-average molecular weight of preferably from 1000 to 20000, more preferably from 2000 to 19000, and particularly preferably from 4000 to 17000. If the weight-average molecular weight is too small, the dispersion stabilizing ability for a sublimable dye decreases, while if it is too large, the ability to disperse the sublimable dye decreases and the viscosity of the ink may excessively increase. Both are not preferable. The weight-average molecular weight of the styrene-acrylic acid copolymer is measured by a GPC (gel permeation chromatography) method.

The glass transition temperature of the styrene-(meth) acrylic copolymer used as the component (B) is preferably from 45° C. to 135° C., more preferably from 55° C. to 120° C., particularly preferably from 60° C. to 110° C.

Further, the acid value of the styrene-(meth)acrylic copolymer used as the component (B) is preferably from 50 mg KOH/g to 250 mg KOH/g, more preferably from 100 mg KOH/g to 250 mg KOH/g, and particularly preferably from 150 mg KOH/g to 250 mg KOH/g. An excessively small acid value causes deterioration in the solubility of the resin, which tends to lower the dispersion stabilizing ability for the sublimable dye, while an excessively large acid value increases the affinity with an aqueous medium, which causes bleeding to easily occur in the printed image. Both are not preferable. The acid value of the resin, which represents the amount in milligrams of KOH required to neutralize 1 g of the resin, is measured in accordance with JIS-K3054.

The component (B), which is a styrene-(meth)acrylic copolymer in the present disclosure, is preferably a component having in its molecule a skeleton represented by formula (2) and/or formula (3) given above. In formula (2), $n_1$ to $n_3$ represent an integer of 1 to 30. In formula (3), $m_1$ and $m_2$ represent an integer of 1 to 43.

In this respect, specific examples of the preferred styrene-(meth)acrylic copolymer of the component (B) include Joncryl 67 (weight-average molecular weight=12,500, acid value=213), Joncryl 678 (weight-average molecular weight=8,500, acid value=215), Joncryl 682 (weight-average molecular weight=1,700, acid value=230), Joncryl 683 (weight-average molecular weight=8,000, acid value=160), and Joncryl 690 (weight-average molecular weight=16,500, acid value=240).

The ink emulsion composition disclosed herein may also be prepared by using two different styrene-acrylic copolymer dispersants when dispersing a coloring matter.

For example, the emulsion composition disclosed herein is preferably produced by the following method.

A styrene-acrylic copolymer is charged into a water-soluble organic solvent and the temperature is raised to 90-120° C. to dissolve it to prepare a solution of a styrene-acrylic copolymer. Further, a styrene-acrylic copolymer is suspended in water, a neutralizing agent is added thereto, and the temperature is raised to 80-95° C. to prepare a neutralized solution. The styrene-acrylic copolymer solution and the neutralized solution thus prepared are mixed with a colorant and the mixture is dispersed. In this way, a styrene-acrylic copolymer emulsion composition containing a colored body can be produced.

It is also preferable to produce the styrene-acrylic copolymer emulsion composition containing a dye and/or a pigment for example by the following method.

A styrene-acrylic copolymer is charged into a water-soluble organic solvent and the temperature is raised to 90-120° C. to prepare a solution of a styrene-acrylic copolymer. A neutralizing agent and water is then charged to the solution, the temperature is lowered to make an emulsion liquid (an emulsion or microemulsion liquid), the emulsion liquid thus prepared is mixed with a dye and/or a pigment, and the mixture is dispersed. In this way, a styrene-acrylic copolymer emulsion composition containing the dye and/or the pigment can be produced.

Examples of the water-soluble organic solvent include glycerin (boiling point: 290° C.), ethylene glycol, propylene glycol (boiling point: 188° C.), dipropylene glycol (boiling point: 230° C.), butyl carbitol (boiling point: 231° C.), methyl triglycol, triethylene glycol, butyl triglycol, butyl carbitol acetate (boiling point: 247° C.), diethylene glycol, 1,5-pentanediol, 1,6-hexanediol, 1,2-hexanediol, methyl diglycol, tripropylene glycol, methanol (boiling point: 64° C.), ethanol (boiling point: 78° C.), 1-propanol (boiling point: 97° C.), 2-propanol (boiling point: 82° C.), 1,2-methoxyethane (boiling point: 93° C.), tetrahydrofuran (boiling point: 66° C.), and p-dioxane (boiling point: 101° C.). These water-soluble organic solvents may be used alone or in combination of at least two thereof.

Since the ink emulsion composition before mixing with the dye and/or the pigment is prepared by neutralizing with a neutralizing agent and mixing with water, it is necessary to use a neutralizing agent.

Examples of the neutralizing agent include hydroxides of alkali metals, hydroxides of alkaline earth metals, aliphatic amine compounds, and alcohol amine compounds.

Examples of alkali metal hydroxides include lithium hydroxide, sodium hydroxide, and potassium hydroxide. Examples of hydroxides of alkaline earth metals include beryllium hydroxide, magnesium hydroxide, calcium hydroxide, and strontium hydroxide. The neutralizing agent is preferably a hydroxide of an alkali metal, more preferably lithium hydroxide, sodium hydroxide, and potassium hydroxide, and more preferably potassium hydroxide.

Examples of the alcohol amine compound include monoethanol amine, diethanol amine, triethanol amine, monopropanol amine, dipropanol amine, tripropanol amine, methylethanol amine, dimethylethanol amine, and N-methyl diethanol amine; among these preferred are tertiary amines, and more preferred is triethanolamine.

Examples of the aliphatic amine compound include ammonia, monomethylamine, dimethylamine, trimethylamine, monoethylamine, diethylamine, and triethylamine; among these preferred is ammonia or triethylamine.

These neutralizing agents may be used alone or in combination of at least two thereof.

The amount of the emulsion liquid to be used is preferably from 10% to 200%, more preferably from 10% to 150%, and particularly preferably from 20% to 100%, based on the mass of the dye and/or the pigment.

In mixing the dye and/or the pigment with the emulsion liquid and dispersing the mixture, the dispersing may be performed using a sand mill (bead mill), a roll mill, a ball mill, a paint shaker, an ultrasonic disperser, or a microfluidizer; among these preferred is a sand mill (bead mill). In pulverizing the coloring material in a sand mill (bead mill), the pulverizing is preferably performed under the condition of increased pulverization efficiency by, for example, using beads of small diameter and increasing the filling rate of beads, and after the pulverization treatment, elementary particles are preferably removed by centrifugal separation or the like. In addition, in terms of increasing the pulverization efficiency as some ink emulsion compositions have foaming properties, it is preferable to adjust pulverization conditions so that foaming is suppressed as much as possible during pulverization. In some cases, for example, a silicone- or acetylene alcohol-based defoamer may be added in trace amounts at the time of pulverizing the pigment. As some defoamers inhibit dispersion and microparticulation, however, it is necessary to use the one not affecting the microparticulation or the stability after dispersion.

After the dispersing or post-treatment such as filtration, the dispersion can be diluted with a small amount of water to adjust the coloring material to a desired concentration.

In the ink emulsion composition disclosed herein, the number-average particle size of the component (A) is preferably from 10 nm to 500 nm. When the number-average particle size of the component (A) is from 10 nm to 500 nm, the composition exhibits excellent storage stability and sedimentation properties. In the present disclosure, the number-average particle size is measured using a dynamic light scattering-type particle size analyzer or according to a small angle X-ray scattering method.

In the ink emulsion composition disclosed herein, the content of the component (B) is preferably in the range of 5 mass % to 250 mass %, and more preferably in the range of 20 mass % to 150 mass %, with respect to the component (A). When the content of the component (B) in the ink emulsion composition is within the above range, the composition exhibits excellent storage stability and sedimentation properties.

[Component (C): Compound Represented by Formula (1)]

The compound represented by formula (1) contained in the ink emulsion composition disclosed herein is a propylene glycol-based compound. In formula (1), t represents an integer of 1 to 5, preferably an integer of 1 to 3, and more preferably 1 or 2. Specific examples thereof include propylene glycol and dipropylene glycol.

In the ink emulsion composition disclosed herein, the content of the component (C) is more than 0.18 mass %. If the content of the component (C) is not more than 0.18 mass %, it is not possible to sufficiently improve the storage stability of the composition.

In addition, in the ink emulsion composition disclosed herein, the content of the component (C) is preferably in the range of 1 mass % to 60 mass %, and more preferably in the range of 10 mass % to 30 mass %. When the content of the component (C) in the ink emulsion composition is within the above range, it is possible to retain an O/W emulsion composition, and thus to prepare a core-shell coloring matter dispersion, contributing to stability improvement.

[Component (D): Compound Having Both Substituents of an Amino Group and a Sulfo Group in its Molecule]

The component (D) disclosed herein is a compound having in its molecule both substituents of an amino group and a sulfo group. It is considered that this compound is ionically bonded to the carboxy group of the component (B) and behaves as if it has a terminal sulfo group, thereby improving the stability.

As the component (D), a compound represented by formula (4) is preferable. In formula (4), R represents an alkylene group which may have a substituent, an alkylidene group which may have a substituent, or an arylene group which may have a substituent.

The phrase "an alkylene group which may have a substituent" refers to an alkylene group which is saturated or unsaturated, is a chain or cyclic (preferably C1-C20) alkylene group, and may have a hetero atom. Examples thereof include a methylene group, an ethylene group, a propylene group, a butylene group, a cyclopentylene group, a cyclohexylene group, a norbornylene group, and an adamantylene group; among these preferred are a (C1-C10) alkylene group, more preferred is a (C1-C5) alkylene group, and particularly preferred are a methylene group, an ethylene group, and a propylene group. Examples of the substituent which may be present in the alkylene group include: a halogen atom; a cyano group; a hydroxy group; a carboxy group; a sulfo group; a sulfamoyl group; a (C1-C4) alkoxy group; a (C1-C4) alkoxy group substituted with at least one selected from the group consisting of a hydroxy group, a (C1-C4) alkoxy group; a sulfo group, and a carboxy group; an N-alkylaminosulfonyl group; an N-phenylaminosulfonyl group; a phospho group; a nitro group; an acyl group; an ureido group; and a (C1-C6) alkyl group substituted with an acylamino group or the like substituted with at least one selected from the group consisting of an acylamino group, a (C1-C4) alkoxy group, a sulfo group, and a carboxy group.

The phrase "an alkylidene group which may have a substituent" refers to an alkylidene group which is saturated or unsaturated, is a chain or cyclic (preferably C1-C20) alkylidene group, and may have a hetero atom. Examples thereof include an ethylidene group, a propylidene group, a butylidene group, a cyclopentylidene group, a cyclohexylidene group, a norbornylidene group, and an adamantylidene group; among these preferred is a (C1-C10) alkylidene group, more preferred is (C1-05) alkylidene group, and particularly preferred are an ethylidene group or a propylidene group. Examples of the substituent which may be present in the alkylidene group are the same as those listed for the alkylene group.

The phrase "an arylene group which may have a substituent" refers to a (preferably C1-C20) arylene group which may have a hetero atom. Examples thereof include a phenylene group, a thienylene group, and a pyrrolylene group, in which two or more ring structures may be condensed with each other as is the case with, for example, a naphthylene group, an anthranylene group, a phenanthrylene group, or a quinolylene group. Examples of the substituent which may be present in the arylene group are the same as those listed for the alkylene group.

Also, R may have an ester structure (—COO—), an ether structure (—O—), or a keto structure (—(C=O)—).

Specific examples of the compound represented by formula (4) include taurine, 4-amino-1-naphthalenesulfonic acid, hydroxylaminosulfonic acid, 5-amino-1-naphthalenesulfonic acid, hydroxylaminosulfonic acid, 6 amino-1-naphthalenesulfonic acid, hydroxylaminosulfonic acid, 3-amino-2,7-naphthalenedisulfonic acid, 2-amino-1,4-benzenesulfonic acid, and 4-aminobenzenesulfonic acid.

In the ink emulsion composition disclosed herein, the content of the component (D) is preferably in the range of 0.1 mass % to 40 mass %, and more preferably in the range of 1 mass % to 20 mass %. When the content of the component (D) in the ink emulsion composition is within the above range, the stability of the ink emulsion composition is improved by solvation due to the influence of the sulfo group.

[Component (E): Water-Soluble Organic Solvent]

The ink emulsion composition disclosed herein may further contain a water-soluble organic solvent (E). Specific examples of the water-soluble organic solvent include: (C1-C4) alcohols such as methanol, ethanol, propanol, isopropanol, butanol, isobutanol, secondary butanol, and tertiary butanol; carboxylic acid amides such as N,N-dimethylformamide or N,N-dimethylacetamide; lactams such as 2-pyrrolidone, hydroxyethyl-2-pyrrolidone, N-methyl-2-pyrrolidone, or N-methylpyrrolidin-2-one; cyclic ureas such as 1,3-dimethylimidazolidin-2-one and 1,3-dimethylhexahydropyrimid-2-one; ketones or ketoalcohols such as acetone, methyl ethyl ketone, and 2-methyl-2-hydroxypentane-4-one; cyclic ethers such as tetrahydrofuran and dioxane; mono-, oligo- or polyalkylene glycols or thioglycols having C2-C6 alkylene units such as ethylene glycol, 1,3-propane diol, 1,2-butylene glycol, 1,4-butylene glycol, 1,6-hexylene glycol, diethylene glycol, triethylene glycol, tetraethylene glycol, polyethylene glycol, polypropylene glycol (represented by formula (1), excluding those with t being 5 or less), thiodiglycol, and dithiodiglycol; polyols (preferably triols) such as trimethylolpropane, glycerin, hexane-1,2,6-triol; (C1-C4) alkyl ethers of polyhydric alcohols such as ethylene glycol monomethyl ether, ethylene glycol monoethyl ether, diethylene glycol monomethyl ether, diethylene glycol monoethyl ether, diethylene glycol monobutyl ether (butyl carbitol), and triethylene glycol monomethyl ether, and triethylene glycol monoethyl ether; γ-butyrolactone; and dimethyl sulfoxide. These organic solvents may be used alone or in combination of at least two thereof.

As used herein, the phrase "water-soluble organic solvent (E)" refers to a water-soluble organic solvent other than those listed in the section "Component (C): Compound Represented by Formula (1)".

Although the water-soluble organic solvent also includes substances which are solid at room temperature, such as trimethylpropane, they are water-soluble even in a solid state and can be used for the same purpose as the water-soluble organic solvent when dissolved in water. They are thus described herein in the category of water-soluble organic solvent for convenience.

The component (E) is preferably a water-soluble organic solvent having in its molecule one or more hydroxy groups.

In the ink emulsion composition disclosed herein, the content of the component (E) is preferably in the range of 1 mass % to 60 mass %, and more preferably in the range of 10 mass % to 30 mass %. When the content of the component (E) in the ink emulsion composition is within the above range, it is possible to retain an O/W emulsion composition, and thus to prepare a core-shell coloring matter dispersion, contributing to stability improvement.

[Component (F): Defoamer]

It is also possible to prepare an ink dispersion composition in which (F) a defoamer is added to the ink emulsion composition.

A defoamer refers to a substance having an action of extinguishing foam or suppressing foaming in a solution, including, for example, an oily substance with low volatility and high diffusing ability (such as higher alcohol) and a nonionic surfactant.

Examples of nonionic surfactants include: ethers such as polyoxyethylene nonylphenyl ether, polyoxyethylene octylphenyl ether, polyoxyethylene dodecyl phenyl ether, polyoxyethylene oleyl ether, polyoxyethylene lauryl ether, and polyoxyethylene alkyl ether; esters such as polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, 3,5-dimethyl-1-hexyne-3-ol; Surfynol 104, 105, 82, 465, Olfine STG, etc. (all manufactured by Nissin Chemical Industry Co., Ltd.); and polyglycol ethers (e.g., Tergitol 15-S-7 manufactured by SIGMA-ALDRICH).

Of these, acetylene glycol-based defoamers are preferred, and more preferred are Surfynol 104, 105, 82, and 465 manufactured by Nissin Chemical Industry Co., Ltd.

In the ink emulsion composition disclosed herein, the content of the component (F) is preferably in the range of 0.01 mass % to 0.5 mass %, and more preferably in the range of 0.05 mass % to 0.3 mass %. Adjusting the content of the component (F) in the ink dispersion composition within the above range provides a defoaming effect during the dispersing, enabling the dispersion to proceed efficiently with no adverse effect on the dispersion stability.

[Component (G): Preservative]

It is also possible to prepare an ink dispersion composition in which a preservative (G) is further added to the ink emulsion composition.

Examples of the preservative include organic sulfur-based compounds, organic nitrogen sulfur-based compounds, organic halogen-based compounds, haloaryl sulfone-based compounds, iodopropargyl-based compounds, haloalkyl-thio-based compounds, nitrile-based compounds, pyridine-based compounds, 8-oxyquinoline-based compounds, benzothiazole-based compounds, isothiazoline-based compounds, dithiol-based compounds, pyridine oxide-based compounds, nitropropane-based compounds, organic tin-based compounds, phenolic compounds, quaternary ammonium salt-based compounds, triazine-based compounds, thiazine-based compounds, anilide-based compounds, adamantane-based compounds, dithiocarbamate-based compounds, brominated indanone-based compounds, benzyl bromoacetate-based compounds, or inorganic salt-based compounds. Without limitation, specific examples of organic halogen-based compounds include sodium pentachlorophenol, specific examples of pyridine oxide-based compounds include sodium 2-pyridinethiol-1-oxide, and specific examples of isothiazoline-based compounds include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Specific examples of other preservatives include anhydrous sodium acetate, sodium sorbate, or sodium benzoate, Proxel® GXL (S) and Proxel® GXL-2 manufactured by Arch Chemicals, Inc.

In the ink dispersion composition disclosed herein, the content of the component (G) is preferably in the range of 0.01 mass % to 0.5 mass %, and more preferably in the range of 0.1 mass % to 0.3 mass %. Adjusting the content of the component (G) in the ink dispersion composition within the above range may provide a bactericidal action, suppressing viscosity increase.

[Other Ingredients]

In addition to the components (A) to (G), the ink emulsion composition disclosed herein may further contain, for example, an antifungal agent, a pH adjuster, a chelating reagent, a rust preventive agent, a water-soluble ultraviolet absorber, a water-soluble polymer compound, a coloring matter solubilizer, an antioxidant, or a surfactant, in addition to the above components.

(Antifungal Agent)

Examples of antifungal agents include sodium dehydroacetate, sodium benzoate, sodium pyridinethione-1-oxide, p-hydroxybenzoic acid ethyl ester, 1,2-benzisothiazolin-3-one, and salts thereof. When an antifungal agent is used, it is preferably used in an amount of 0.02 mass % to 1.00 mass % in the emulsion composition.

(PH Adjuster)

As the pH adjusting agent, any substance can be used as long as the pH of the ink can be controlled within the range of approximately 5-11 without adversely affecting the ink to be prepared. Specific examples thereof include: alkanolamines such as diethanolamine, triethanolamine, and N-methyldiethanolamine; alkali metal hydroxides such as lithium hydroxide, sodium hydroxide, and potassium hydroxide; ammonium hydroxide (ammonia water); carbonates of alkali metals such as lithium carbonate, sodium carbonate, sodium hydrogencarbonate, and potassium carbonate; alkali metal salts of organic acids such as potassium acetate; and inorganic bases such as sodium silicate, and disodium phosphate.

(Chelating Reagent)

Specific examples of the chelating reagent include sodium ethylenediaminetetraacetate, sodium nitrilotriacetate, sodium hydroxyethylethylenediamine triacetate, sodium diethylenetriamine pentaacetate, and sodium uracil diacetate.

(Rust Preventive Agent)

Examples of the rust inhibitor include acidic sulfite, sodium thiosulfate, ammonium thioglycolate, diisopropylammonium nitrite, pentaerythritol tetranitrate, and dicyclohexylammonium nitrite.

(Water-Soluble Ultraviolet Absorber)

Examples of water-soluble ultraviolet absorbers include sulfonated benzophenone-based compounds, benzotriazole-based compounds, salicylic acid-based compounds, cinnamic acid-based compounds, and triazine-based compounds.

(Water-Soluble Polymer Compound)

Examples of water-soluble polymer compounds include polyvinyl alcohols, cellulose derivatives, polyamines, and polyimines.

(Antioxidant)

Examples of antioxidants may include a variety of organic and metal complex-based anti-fading agents. Examples of the organic anti-fading agents include hydroquinones, alkoxyphenols, dialkoxyphenols, phenols, anilines, amines, indans, chromans, alkoxyanilines, and heterocycles.

(Surfactant)

Examples of surfactants include known surfactants such as anionic, cationic, nonionic, silicone-based, and fluorine-based surfactants.

Examples of anionic surfactants include alkylsulfonates, alkylcarboxylates, α-olefin sulfonates, polyoxyethylene alkyl ether acetates, N-acylamino acids and salts thereof, N-acylmethyltaurine salts, alkyl sulfate polyoxyalkyl ether sulfates, alkyl sulfate polyoxyethylene alkyl ether phosphates, rosin acid soap, castor oil sulfates, lauryl alcohol sulfates, alkylphenol-type phosphoric acid ester, alkyl-type phosphoric acid ester, alkylaryl sulfonate, diethyl sulfosuccinate, diethylhexylsulfosuccinate, and dioctylsulfosuccinate.

In the present disclosure, it is particularly preferable to contain an anionic surfactant. Among them, sulfosuccinic acid, specifically, diethylsulfosuccinate, diethylhexylsulfosuccinate, dioctylsulfosuccinate, and the like are particularly preferable.

Examples of cationic surfactants include 2-vinylpyridine derivatives and poly4-vinylpyridine derivatives.

Examples of amphoteric surfactants include lauryldimethylaminoacetic acid betaine, 2-alkyl-N-carboxymethyl-N-hydroxyethylimidazolinium betaine, coconut oil fatty acid amidopropyldimethylaminoacetic acid betaine, polyoctylpolyaminoethylglycine, and imidazoline derivatives.

Examples of nonionic surfactants include: ethers such as polyoxyethylene nonylphenyl ether, polyoxyethylene octylphenyl ether, polyoxyethylene dodecylphenyl ether, polyoxyethylene oleyl ether, polyoxyethylene lauryl ether, and polyoxyethylene alkyl ether; esters such as polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, and 3,5-dimethyl-1-hexyne-3-ol; Surfynol 104, 105, 82, 465, Olfine STG, etc. (all manufactured by Nissin Chemical Industry Co., Ltd.); and polyglycol ethers (e.g., Tergitol 15-S-7 manufactured by SIGMA-ALDRICH).

The above-described ink preparation agents are used alone or in combination.

Examples of the silicone-based surfactants include polyether-modified siloxane and polyether-modified polydimethylsiloxane. Specific examples of commercially available products include BYK-347 (polyether-modified siloxane), BYK-345, and BYK-348 (polyether-modified polydimethylsiloxane), all manufactured by BYK Japan KK.

Examples of the fluorine-based surfactants include perfluoroalkyl sulfonic acid compounds, perfluoroalkyl carboxylic acid-based compounds, perfluoroalkyl phosphoric acid ester compounds, perfluoroalkyl ethylene oxide adducts, and polyoxyalkylene ether polymer compounds having a perfluoroalkyl ether group on a side chain. Specific examples of commercially available products include Zonyl TBS, FSP, FSA, FSN-100, FSN, FSO-100, FSO, FS-300, Capstone FS-30, FS-31 (manufactured by DuPont); PF-151N, and PF-154N (manufactured by Omnova).

The ink emulsion liquid disclosed herein preferably has an emulsion composition that contains particles such that, when a circumscribed circle and an inscribed circle are applied concentrically to each particle on an STEM image, for more than half of the particles, the diameter of the inscribed circle is 5 nm or more and less than 300 nm and the roundness defined by the difference in radius between the concentric circumscribed circle and the inscribed circle is 20 nm or less.

The ink emulsion composition disclosed herein is extremely excellent in storage stability. Accordingly, this composition can provide excellent ejection stability when used for water-based inks, particularly water-based inks for inkjet printing.

In the case of a water-based ink, it is preferable that the above-described dye and/or pigment is contained in the water-based ink in an amount of 0.3 mass % to 10 mass % in terms of pure colorant.

A water-based ink may be obtained with an additive such as an antifungal agent, a pH adjuster, a chelate agent, a rust preventive agent, a water-soluble ultraviolet absorber, a water-soluble polymer compound, a coloring matter solubilizer, an antioxidant, or a surfactant.

The pH of the water-based ink of the present disclosure is preferably 5 to 11, more preferably 7 to 10, for the purpose of improving storage stability. The pH and surface tension of the ink composition of the present disclosure can be appropriately adjusted with a pH adjuster or a surfactant as described later.

[Component (H): Compound Represented by Formula (5)]

The water-based ink disclosed herein may further contain (H) a compound represented by formula (5).

In formula (5), s is an average degree of polymerization and represents 1 to 5. As used herein, the average degree of polymerization is indicated by rounding off the first digit after the decimal point (rounding down at 4 or less and rounding up at 5 or more). Specific examples of the compound represented by formula (5) include compounds such as glycerin, diglycerin, triglycerin, tetraglycerin, pentaglycerin, hexaglycerin, and heptaglycerin, and mixtures thereof. The degrees of polymerization of hexaglycerin and heptaglycerin are 6 and 7, respectively, but when they are not used alone but when used as a mixture with those with a smaller degree of polymerization, the mixture may be contained in the water-based ink of the present disclosure as long as the average degree of polymerization of the mixture is in the above-described range. Also, when the mixture has 50% glycerin and 50% triglycerin, for example, the average degree of polymerization s is 2. However, a larger glycerin content causes smoke or the like during sublimation transfer, leading to problems during transfer dyeing, such as poor visibility in the work environment. Therefore, the content of glycerin in the compound represented by formula (5) is usually 10% or less, preferably 8% or less, based on the gas chromatography standard (peak area ratio), and the lower limit may be set at or below the detection limit, that is, it may be 0%.

Commercially available products of the compound represented by formula (5) include, for example, Glycerin (average degree of polymerization s=1), Diglycerin S (average degree of polymerization s=2), and Polyglycerin #310 (s=4), all manufactured by Sakamoto Yakuhin Kogyo Co. Ltd.

In the water-based ink of the present disclosure, the content of the component (H) is preferably in the range of 5 mass % to 60 mass %, and more preferably in the range of 10 mass % to 40 mass %. When the content of the component (H) in the water-based ink is within the above range, the ink exhibits excellent storage stability and less smoke is produced during sublimation transfer.

The water-based ink of the present disclosure can be used in various fields. The water-based ink is, however, suitable for water-based writing ink, water-based printing ink, information-recording ink, textile printing, and the like, and is particularly preferably used as ink for ink jet recording.

Examples

Hereinafter, the present disclosure will be described in more detail with reference to examples, yet the present disclosure is not limited by these examples. In the examples, "parts" means "parts by mass", and "%" means "mass %".

[Emulsion Liquid 1]

To 48% sodium hydroxide (3.7 parts), deionized water (96.3 parts), and propylene glycol (60 parts) was added 40 parts of Joncryl 683 (a styrene-(meth)acrylic copolymer, manufactured by BASF, having in its molecule a skeleton of formula (2) with a weight-average molecular weight of 8,000, a glass transition temperature of 75° C., and an acid value of 160 mg KOH/g), the mixture was then stirred at raised temperatures of 90-120° C. for 5 hours, and an emulsion liquid 1 of Joncryl 683 was obtained.

[Emulsion Liquid 2]

To 48% sodium hydroxide (4.1 parts), deionized water (95.9 parts), and propylene glycol (60 parts) was added 40 parts of Joncryl 690 (a styrene-(meth)acrylic copolymer, manufactured by BASF, having in its molecule a skeleton of formula (3) with a weight-average molecular weight of 16,500, a glass transition temperature of 102° C., and an acid value of 240 mg KOH/g), the mixture was then stirred at raised temperatures of 90-120° C. for 5 hours, and an emulsion liquid 2 of Joncryl 690 was obtained.

[Emulsion Liquid 3]

40 parts of Joncryl 690 (a styrene-(meth)acrylic copolymer, manufactured by BASF, having in its molecule a skeleton of formula (3) with a weight-average molecular weight of 16,500, a glass transition temperature of 102° C., and an acid value of 240 mg KOH/g) was added to propylene glycol (60 parts), and the mixture was then stirred at raised temperatures of 90-120° C. for 5 hours to obtain a 40% solution of Joncryl 690. The mixture was then cooled down to 70-90° C., added with 48% sodium hydroxide (4.1 parts) and stirred for 1 hour. Then, the mixture was further added with deionized water (180 parts) and 0.1 parts of Surfynol 104 (manufactured by Nissin Chemical Industry Co., Ltd.), and stirred for 1 hour with keeping a temperature of 70-95° C. to obtain an emulsion liquid (A) of Joncryl 690.

The resulting emulsion liquid (A) was subjected to dispersion treatment for about 15 hours in a sand mill using glass beads having a diameter of 0.2 mm under cooling. After the dispersion treatment, filtration was carried out with glass fiber filter paper GC-50 (manufactured by Toyo Roshi Kaisha Ltd., filter pore diameter=0.5 μm) to obtain an emulsion liquid 3 of Joncryl 690 from which components having large particle size were removed.

[Emulsion Liquid 4]

To 48% sodium hydroxide (3.1 parts), deionized water (96.9 parts), and propylene glycol (60 parts) was added 40 parts of Joncryl 678 (a styrene-(meth)acrylic copolymer, manufactured by BASF, having in its molecule a skeleton of formula (2) with a weight-average molecular weight of 8,500, a glass transition temperature of 85° C., and an acid value of 215 mg KOH/g), the mixture was then stirred at raised temperatures of 90-120° C. for 5 hours, and an emulsion liquid 4 of Joncryl 678 was obtained.

[Emulsion Liquid 5]

To 48% potassium hydroxide (4.3 parts), deionized water (95.7 parts), and propylene glycol (60 parts) was added 40 parts of Joncryl 678 (a styrene-(meth)acrylic copolymer, manufactured by BASF, having in its molecule a skeleton of formula (2) with a weight-average molecular weight of 8,500, a glass transition temperature of 85° C., and an acid value of 215 mg KOH/g), the mixture was then stirred at raised temperatures of 90-120° C. for 5 hours, and an emulsion liquid 5 of Joncryl 678 was obtained.

[Emulsion Liquid 6]

To 48% lithium hydroxide (1.9 parts), deionized water (98.1 parts), and propylene glycol (60 parts) was added 40 parts of Joncryl 678 (a styrene-(meth)acrylic copolymer, manufactured by BASF, having in its molecule a skeleton of formula (2) with a weight-average molecular weight of 8,500, a glass transition temperature of 85° C., and an acid value of 215 mg KOH/g), the mixture was then stirred at raised temperatures of 90-120° C. for 5 hours, and an emulsion liquid 6 of Joncryl 678 was obtained.

[Aqueous Solution 1]

A mixture was obtained by mixing 40 parts of Joncryl 690 (a styrene-(meth)acrylic copolymer, manufactured by BASF, having in its molecule a skeleton of formula (3) with a weight-average molecular weight of 16,500, a glass transition temperature of 102° C., and an acid value of 240 mg KOH/g), 48% sodium hydroxide (6.8 parts), deionized water (153.0 parts), 0.1 parts of Proxel GXL (manufactured by Arch Chemicals, Inc.), and 0.1 parts of Surfynol 104 (manufactured by Nissin Chemical Industry Co., Ltd.), and stirred at raised temperatures of 70-95° C. for 10 hours to obtain a 20% aqueous solution 1 of Joncryl 690.

[Examples 1-26 and Comparative Examples 1-6]—Preparation of Ink Dispersion Composition—

Glass beads having a diameter of 0.2 mm were respectively added to the mixtures of the components listed in Tables 1 to 6, and dispersion treatment was carried out for about 15 hours in a sand mill under water cooling. Deionized water was added to each obtained liquid so that the content of dyes in the total mass of the liquid was adjusted to 15%. The resulting liquids were respectively filtered through glass fiber filter paper GC-50 (manufactured by ADVANTEC Co., Ltd.) to obtain ink dispersion compositions of our examples and comparative examples.

TABLE 1

| Ink dispersion composition | | Examples | | | | | | |
|---|---|---|---|---|---|---|---|---|
| | | 1 | 2 | 3 | 4 | 5 | 6 | 7 |
| Component (A): dye and/or pigment | Or25 | 30 | 30 | 30 | 30 | | | |
| | R60 | | | | | 30 | | |
| | B360 | | | | | | 30 | |
| | B359 | | | | | | | 30 |
| | Y54 | | | | | | | |
| | B77 | | | | | | | |
| Component (B): emulsition liquid containing styrene-(meth)acrylic copolymer | Emulsion Liquid 1 | 78 | | | | | | |
| | Emulsion Liquid 2 | | | | | 78 | 78 | 78 |
| | Emulsion Liquid 3 | | 78 | | 66 | | | |
| | Emulsion Liquid 4 | | | 78 | | | | |
| | Emulsion Liquid 5 | | | | | | | |
| | Emulsion Liquid 6 | | | | | | | |
| Aqueous solution | Aqueous Solution 1 | | | | 4 | | | |
| Component (C) | Propylene glycol | 10 | 10 | 10 | 10 | 10 | 10 | 10 |
| Other components | 10% SF 104 PG | 0.4 | 0.4 | 0.4 | 0.4 | 0.4 | 0.4 | 0.4 |
| | Proxel GXL | 0.3 | 0.3 | 0.3 | 0.3 | 0.3 | 0.3 | 0.3 |
| | Deionized water | 81.3 | 81.3 | 81.3 | 89.3 | 81.3 | 81.3 | 81.3 |
| Total | | 200 | 200 | 200 | 200 | 200 | 200 | 200 |

TABLE 2

| Ink dispersion composition | | Examples | | | | | |
|---|---|---|---|---|---|---|---|
| | | 8 | 9 | 10 | 11 | 12 | 13 |
| Component (A): dye and/or pigment | Or25 | | | | 30 | | |
| | R60 | | | | | 30 | |
| | B360 | | | | | | 30 |
| | B359 | | | | | | |
| | Y54 | 30 | | | | | 30 |
| | B77 | | 30 | | | | |
| Component (B): emulsition liquid containing styrene-(meth)acrylic copolymer | Emulsion Liquid 1 | | | | | | |
| | Emulsion Liquid 2 | 144 | 144 | 144 | 144 | 144 | 78 |
| | Emulsion Liquid 3 | | | | | | |
| | Emulsion Liquid 4 | | | | | | |
| | Emulsion Liquid 5 | | | | | | |
| | Emulsion Liquid 6 | | | | | | |
| Aqueous solution | Aqueous Solution 1 | | | | | | |
| Component (C) | Propylene glycol | 10 | 10 | 10 | 10 | 10 | 10 |
| Other components | 10% SF 104 PG | 0.4 | 0.4 | 0.4 | 0.4 | 0.4 | 0.4 |
| | Proxel GXL | 0.3 | 0.3 | 0.3 | 0.3 | 0.3 | 0.3 |
| | Deionized water | 15.3 | 15.3 | 15.3 | 15.3 | 15.3 | 81.3 |
| Total | | 200 | 200 | 200 | 200 | 200 | 200 |

TABLE 3

| Ink dispersion composition | | Examples | | | | | |
|---|---|---|---|---|---|---|---|
| | | 14 | 15 | 16 | 17 | 18 | 19 |
| Component (A): dye and/or pigment | Or25 | 30 | | | | | 30 |
| | R60 | | 30 | | | | |
| | B360 | | | 30 | | | |
| | B359 | | | | 30 | | |
| | Y54 | | | | | 30 | |
| | B77 | | | | | | |
| Component (B): emulsition liquid containing styrene-(meth)acrylic copolymer | Emulsion Liquid 1 | | | | | | |
| | Emulsion Liquid 2 | | | | | | |
| | Emulsion Liquid 3 | | | | | | |
| | Emulsion Liquid 4 | | | | | | |
| | Emulsion Liquid 5 | 120 | 120 | 90 | 60 | 85 | |
| | Emulsion Liquid 6 | | | | | | 85 |
| Aqueous solution Component (C) | Aqueous Solution 1 | | | | | | |
| | Propylene glycol | 10 | 10 | 10 | 10 | 10 | 10 |
| Other components | 10% SF 104 PG | 0.4 | 0.4 | 0.4 | 0.4 | 0.4 | 0.4 |
| | Proxel GXL | 0.3 | 0.3 | 0.3 | 0.3 | 0.3 | 0.3 |
| | Deionized water | 39.3 | 39.3 | 69.3 | 99.3 | 74.3 | 74.3 |
| Total | | 200 | 200 | 200 | 200 | 200 | 200 |

TABLE 4

| Components | | Comparative Examples | | | |
|---|---|---|---|---|---|
| | | 1 | 2 | 3 | 4 |
| Component (A): dye and/or pigment | Or25 | 30 | | | |
| | R60 | | 30 | | |
| | B360 | | | 30 | |
| | Y54 | | | | 30 |
| Component (B): emulsion liquid containing styrene-(meth)acrylic copolymer | Emulsion Liquid 1 | | | | |
| | Emulsion Liquid 2 | | | | |
| | Emulsion Liquid 3 | | | | |
| | Emulsion Liquid 4 | | | | |
| Aqueous solution Component (C) | Aqueous Solution 1 | 44 | 44 | 44 | 44 |
| | Propylene glycol | | | | |
| Other components | 10% SF 104 PG | 0.4 | 0.4 | 0.4 | 0.4 |
| | Proxel GXL | 0.3 | 0.3 | 0.3 | 0.3 |
| | Deionized water | 125.3 | 125.3 | 125.3 | 125.3 |
| Total | | 200 | 200 | 200 | 200 |

TABLE 6

| Components | | Comparative Examples | |
|---|---|---|---|
| | | 5 | 6 |
| Component (A): dye and/or pigment | Or25 | 30 | |
| | R60 | | 30 |
| | Y54 | | |
| Component (B): emulsion liquid containing styrene-(meth)acrylic copolymer | Emulsion Liquid 1 | | |
| | Emulsion Liquid 2 | | |
| | Emulsion Liquid 3 | | |
| Aqueous solution | Aqueous Solution 1 | 44 | 44 |
| Component (D) | Taurine | | |
| Component (C) | Propylene glycol | | |
| Other components | 10% SF 104 PG | 0.4 | 0.4 |
| | Proxel GXL | 0.3 | 0.3 |
| | Deionized water | 125.3 | 125.3 |
| Total | | 200 | 200 |

TABLE 5

| Ink dispersion composition | | Examples | | | | | | |
|---|---|---|---|---|---|---|---|---|
| | | 20 | 21 | 22 | 23 | 24 | 25 | 26 |
| Component (A): dye and/or pigment | Or25 | 30 | | | 30 | | 30 | |
| | R60 | | 30 | 30 | | | | |
| | Y54 | | | | | 30 | | 30 |
| Component (B): emulsion liquid containing styrene-(meth)acrylic copolymer | Emulsion Liquid 1 | | 120 | 100 | 120 | | | |
| | Emulsion Liquid 2 | | | | | 100 | 120 | |
| | Emulsion Liquid 3 | 120 | | | | | | 120 |
| Aqueous solution | Aqueous Solution 1 | | | | | | | |
| Component (D) | Taurine | 30 | 30 | 30 | 30 | 20 | | |
| Component (C) | Propylene glycol | 10 | 10 | 10 | 10 | 10 | | |
| Other components | 10% SF 104 PG | 0.4 | 0.4 | 0.4 | 0.4 | 0.4 | 0.4 | 0.4 |
| | Proxel GXL | 0.3 | 0.3 | 0.3 | 0.3 | 0.3 | 0.3 | 0.3 |
| | Deionized water | 9.3 | 9.3 | 29.3 | 9.3 | 39.3 | 49.3 | 49.3 |
| Total | | 200 | 200 | 200 | 200 | 200 | 200 | 200 |

The numbers in the tables each represent "the number of parts", and the abbreviations are as follows.

Or25: C.I. Disperse Orange 25
R60: C.I. Disperse Red 60
B360: C.I. Disperse Blue 360
B359: C.I. Disperse Blue 359
Y54: C.I. Disperse Yellow 54
B77: C.I. Disperse Blue 77
10% SF 104 PG: Surfynol 104 diluted to 10% concentration with propylene glycol
Surfynol 104: an acetylene glycol surfactant (manufactured by Air Products and Chemicals, Inc.), a defoamer
Proxel GXL: a preservative (manufactured by Lonza)

[Evaluation Results]

For Examples 1 to 26 and Comparative Examples 1 to 6, the following tests were conducted and summarized in Tables 7 to 12.

[Particle Size Change Test for Confirmation of Sedimentation Properties]

The median diameter (D50, number-average particle size) of the colorant (component (A)) in each ink composition in an initial state and after stored for 1 week at 60° C. was measured with MICRO TRAC UPA EX150 (manufactured by Microtrac Bel).

The presence or absence of sediment was visually confirmed for each ink dispersion composition after stored at 60° C. for 1 week, and the evaluation was made on the basis of the following criteria.

Good: No sedimentation occurred.
Fair: Slight sedimentation occurred.
Poor: Significant sedimentation occurred.

When observed with STEM (Scanning Transmission Electron Microscope), it was found that each of our examples yielded an ink dispersion composition containing dyes and a styrene-(meth)acrylic copolymer and having a core-shell structure with the dyes as the core layer and the styrene-(meth)acrylic copolymer as the shell layer, whereas in any of comparative examples, such a core-shell structure was not formed by the dyes and the styrene-(meth)acrylic copolymer in the ink dispersion composition.

TABLE 7

|  | Examples | | | | | | |
| --- | --- | --- | --- | --- | --- | --- | --- |
|  | 1 | 2 | 3 | 4 | 5 | 6 | 7 |
| Particle size D50 (nm) [initial] | 102 | 114 | 97 | 132 | 122 | 87 | 120 |
| Particle size D50 (nm) [60° C., 1 week] | 168 | 176 | 120 | 167 | 151 | 98 | 150 |
| Sedimentation properties | Good | Good | Good | Good | Good | Good | Good |

TABLE 8

|  | Examples | | | | | |
| --- | --- | --- | --- | --- | --- | --- |
|  | 8 | 9 | 10 | 11 | 12 | 13 |
| Particle size D50 (nm) [initial] | 106 | 131 | 107 | 97 | 109 | 105 |
| Particle size D50 (nm) [60° C., 1 week] | 109 | 140 | 155 | 121 | 166 | 133 |
| Sedimentation properties | Good | Good | Fair | Fair | Fair | Fair |

TABLE 9

|  | Examples | | | | | |
| --- | --- | --- | --- | --- | --- | --- |
|  | 14 | 15 | 16 | 17 | 18 | 19 |
| Particle size D50 (nm) [initial] | 107 | 117 | 98 | 159 | 114 | 115 |
| Particle size D50 (nm) [60° C., 1 week] | 166 | 120 | 102 | 151 | 126 | 203 |
| Sedimentation properties | Good | Good | Good | Good | Good | Fair |

TABLE 10

|  | Comparative Examples | | | |
| --- | --- | --- | --- | --- |
|  | 1 | 2 | 3 | 4 |
| Particle size D50 (nm) [initial] | 97 | 88 | 101 | 125 |
| Particle size D50 (nm) [60° C., 1 week] | 540 | 188 | 140 | 188 |
| Sedimentation properties | Poor | Poor | Poor | Poor |

TABLE 11

|  | Examples | | | | | | |
| --- | --- | --- | --- | --- | --- | --- | --- |
|  | 20 | 21 | 22 | 23 | 24 | 25 | 26 |
| Particle size D50 (nm) [initial] | 103 | 100 | 103 | 110 | 105 | 105 | 110 |
| Particle size D50 (nm) [60° C., 1 week] | 116 | 117 | 122 | 145 | 105 | 110 | 118 |
| Sedimentation properties | Good | Good | Good | Good | Good | Good | Good |

TABLE 12

|  | Comparative Examples | |
| --- | --- | --- |
|  | 5 | 6 |
| Particle size D50 (nm) [initial] | 97 | 88 |
| Particle size D50 (nm) [60° C., 1 week] | 540 | 188 |
| Sedimentation properties | Poor | Poor |

From the above results, in each of Examples 1 to 26, there was no large change in the particle size, and the storage stability was excellent. On the other hand, in each of Comparative Examples 1 to 6, an increase in particle size was observed.

From the above, it was found that all of the inks of our examples are excellent in dispersion stability. On the other hand, all of the comparative examples were inferior in dispersion stability.

[Examples 27 to 33 and Comparative Examples 7 to 10]—Preparation of Ink Composition—

The ink dispersion compositions prepared in the above Examples and Comparative Examples were further mixed with the components listed in Tables 13 to 14 to obtain ink compositions.

TABLE 13

| Ink composition | Examples | | | | | | |
|---|---|---|---|---|---|---|---|
| | 27 | 28 | 29 | 30 | 31 | 32 | 33 |
| Composition of Example 3 (containing Or25) | 30 | | | | | | 5 |
| Composition of Example 8 (containing Y54) | | 30 | | | | | 10 |
| Composition of Example 5 (containing R60) | | | 30 | | | | 5 |
| Composition of Example 6 (containing B360) | | | | 30 | | | 10 |
| Composition of Example 7 (containing B359) | | | | | 30 | | |
| Composition of Example 9 (containing B77) | | | | | | 30 | |
| Aqueous Solution 1 | | | | | | | |
| Emulsion Liquid 3 | 10 | 10 | 10 | 10 | 10 | 10 | 10 |
| Diglycerin S | 10 | 10 | 10 | 10 | 10 | 10 | 10 |
| Surfynol 420 | 0.3 | 0.3 | 0.3 | 0.3 | 0.3 | 0.3 | 0.3 |
| Deionized water | 49.7 | 49.7 | 49.7 | 49.7 | 49.7 | 49.7 | 49.7 |
| Total | 100 | 100 | 100 | 100 | 100 | 100 | 100 |

TABLE 14

| Ink composition | Comparative Examples | | | |
|---|---|---|---|---|
| | 7 | 8 | 9 | 10 |
| Composition of Comparative Example 1 (containing Or25) | 30 | | | |
| Composition of Comparative Example 4 (containing Y54) | | 30 | | |
| Composition of Comparative Example 2 (containing R60) | | | 30 | |
| Composition of Comparative Example 3 (containing B360) | | | | 30 |
| Aqueous Solution 1 | 10 | 10 | 10 | 10 |
| Diglycerin S | 10 | 10 | 10 | 10 |
| Surfynol 420 | 0.3 | 0.3 | 0.3 | 0.3 |
| Deionized water | 49.7 | 49.7 | 49.7 | 49.7 |
| Total | 100 | 100 | 100 | 100 |

The numbers in the tables each represent "the number of parts", and the abbreviations are as follows.

Diglycerin S: a compound represented by formula (5), where s is 2 and the glycerin content is 0.5%, manufactured by Sakamoto Yakuhin Kogyo Co., Ltd.

Surfynol 420: a surfactant, manufactured by Nissin Chemical Industry Co., Ltd.

[Evaluation Results]

Examples 27 to 33 and Comparative Examples 7 to 10 were evaluated for sedimentation properties with the above-described method, and the evaluation results are summarized in Tables 15 to 16.

TABLE 15

| | Examples | | | | | | |
|---|---|---|---|---|---|---|---|
| | 27 | 28 | 29 | 30 | 31 | 32 | 33 |
| Particle size D50 (nm) [initial] | 110 | 100 | 120 | 110 | 100 | 97 | 98 |
| Particle size D50 (nm) [60° C., 1 week] | 140 | 135 | 120 | 145 | 135 | 128 | 133 |
| Sedimentation properties | Good | Good | Good | Good | Good | Good | Good |

TABLE 16

| | Comparative Examples | | | |
|---|---|---|---|---|
| | 7 | 8 | 9 | 10 |
| Particle size D50 (nm) [initial] | 98 | 98 | 110 | 99 |

TABLE 16-continued

| | Comparative Examples | | | |
|---|---|---|---|---|
| | 7 | 8 | 9 | 10 |
| Particle size D50 (nm) [60° C., 1 week] | 280 | 134 | 188 | 145 |
| Sedimentation properties | Poor | Fair | Fair | Fair |

From the above results, in each of our examples, neither sedimentation nor a significant change in particle size was observed, and the storage stability was excellent. On the other hand, in each of the comparative examples, sedimentation was observed and, in Comparative Example 8, separation of the dispersion liquid occurred.

From the above, it was found that all of the inks of our examples are excellent in dispersion stability. On the other hand, all of the comparative examples were inferior in dispersion stability.

[Emulsion Liquid 7]

To 48% sodium hydroxide (3.1 parts), deionized water (96.9 parts), and dipropylene glycol (a compound represented by formula (1) with t=2) (60 parts) was added 40 parts of Joncryl 678 (a styrene-(meth) acrylic copolymer having in its molecule a skeleton of formula (2) with a weight-average molecular weight of 8,500, a glass transition temperature of 85° C., and an acid value of 215 mg KOH/g), the mixture was then stirred at raised temperatures of 90-120° C. for 5 hours, and an emulsion liquid 7 of Joncryl 678 was obtained.

[Example 34]—Preparation of Ink Dispersion Composition—

Glass beads having a diameter of 0.2 mm were added to the mixtures of the components listed in Table 17, and dispersion treatment was carried out for about 15 hours in a sand mill under water cooling. Deionized water was added to each obtained liquid so that the content of dyes in the total mass of the liquid was adjusted to 15%. The resulting liquids were respectively filtered through glass fiber filter paper GC-50 (manufactured by ADVANTEC Co., Ltd.) to obtain ink dispersion compositions of our examples.

TABLE 17

| Ink dispersion composition | | Example 34 |
|---|---|---|
| Component (A): dye and/or pigment | R60 | 30 |
| Component (B): emulsition liquid containing styrene-(meth)acrylic copolymer | Emulsion Liquid 7 | 78 |
| Component (C) | Dipropylene glycol | 5 |
| Other components | 10% SF 104 PG | 0.4 |
| | Proxel GXL | 0.3 |
| | Deionized water | 86.3 |
| Total | | 200 |

The numbers in the table represent "the number of parts".
R60: C.I. Disperse Red 60
10% SF 104 PG: Surfynol 104 diluted to 10% concentration with propylene glycol
Surfynol 104: an acetylene glycol surfactant (manufactured by Air Products and Chemicals, Inc.), a defoamer
Proxel GXL: a preservative (manufactured by Lonza)
[Evaluation Results]
Example 34 was evaluated for sedimentation properties with the above-described method, and the evaluation results are summarized in Table 18.

TABLE 18

| | Example 34 |
|---|---|
| Particle size D50 (nm) [initial] | 120 |
| Particle size D50 (nm) [60° C., 1 week] | 136 |
| Sedimentation properties | Good |

From the above results, also in Example 34, neither sedimentation nor a significant change in particle size was observed, and the storage stability was excellent.

INDUSTRIAL APPLICABILITY

The ink emulsion composition and the water-based ink composition according to the disclosure have high storage stability and are very useful particularly for water-based ink in inkjet applications.

The invention claimed is:

1. An ink dispersion composition comprising: (A) a dye and/or a pigment; (B) a styrene-(meth)acrylic copolymer; (C) a compound in an amount of more than 0.18 mass %; and (F) a defoamer, wherein the defoamer is 2,4,7,9-tetramethyl-5-decyne-4,7-diol, the compound (C) being represented by formula (1):

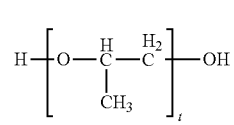

where t represents 1 to 5.

2. The ink dispersion composition according to claim 1, wherein the component (A) is at least one dye selected from the group consisting of a disperse dye, an oil-soluble dye, and a vat dye.

3. The ink dispersion composition according to claim 1, wherein the component (A) is at least one dye selected from the group consisting of C.I. Disperse Yellow 54, C.I. Disperse Orange 25, C.I. Disperse Red 60, C.I. Disperse Blue 72, 359, 360, C.I. Disperse Brown 26, 27, and C.I. Solvent Orange 60.

4. The ink dispersion composition according to claim 1, wherein the component (B) has a weight-average molecular weight of 1000 or more and 20000 or less.

5. The ink dispersion composition according to claim 1, wherein the component (B) has a glass transition temperature of 45° C. or higher and 135° C. or lower.

6. The ink dispersion composition according to claim 1, wherein the component (B) is a styrene-acrylic copolymer having in its molecule a skeleton represented by the following formula (2) or (3):

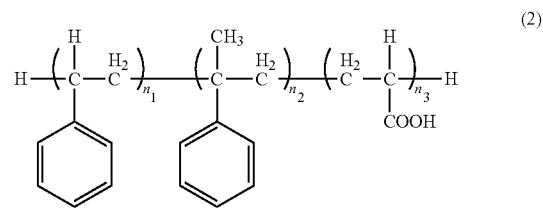

where $n_1$ to $n_3$ each represent an integer of 1 to 30, or

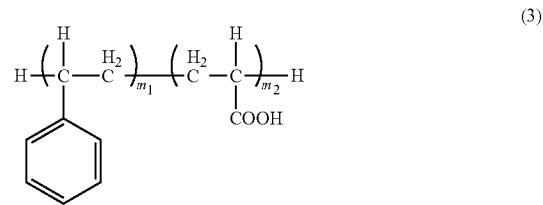

where $m_1$ and $m_2$ each represent an integer of 1 to 43.

7. The ink dispersion composition according to claim 1, wherein t is 2 in the component (C).

8. The ink dispersion composition according to claim 1, wherein the composition further comprises: (D) a compound having in its molecule both substituents of an amino group and a sulfo group.

9. The ink dispersion composition according to claim 8, wherein the component (D) is a compound represented by formula (4):

$$H_2N-R-SO_3H \quad (4)$$

where R represents an alkylene group, an alkylidene group, or an arylene group which may have a substituent.

10. The ink dispersion composition according to claim 1, wherein the composition further comprises: (E) a water-soluble organic solvent.

11. The ink dispersion composition according to claim 10, wherein the component (E) is a water-soluble organic solvent having in its molecule one or more hydroxy groups.

12. The ink dispersion composition according to claim 1, wherein the component (A) has a number-average particle size of 10 nm to 500 nm.

13. The ink dispersion composition according to claim 1, wherein the composition further comprises: (G) a preservative.

14. A water-based ink comprising the ink dispersion composition as recited in claim 1.

15. The water-based ink according to claim 14, wherein the water-based ink further comprises: (H) a compound represented by formula (5):

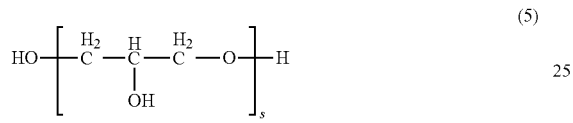

(5)

where s represents 1 to 5.

* * * * *